US010060666B2

(12) United States Patent
Nachawati et al.

(10) Patent No.: US 10,060,666 B2
(45) Date of Patent: Aug. 28, 2018

(54) REFRIGERATED POST-MIX DISPENSER

(71) Applicant: PepsiCo, Inc., Purchase, NY (US)

(72) Inventors: Maher Nachawati, Stamford, CT (US); William Segiet, Bethel, CT (US); Aaron Stein, Middletown, CT (US); Fernando Ubidia, Ludlow, MA (US)

(73) Assignee: PEPSICO, INC., Purchase, NY (US)

( * ) Notice: Subject to any disclaimer, the term of this patent is extended or adjusted under 35 U.S.C. 154(b) by 40 days.

(21) Appl. No.: 15/135,166

(22) Filed: Apr. 21, 2016

(65) Prior Publication Data

US 2017/0305734 A1 Oct. 26, 2017

(51) Int. Cl.

| | |
|---|---|
| ***B67B 7/00*** | (2006.01) |
| ***G01F 11/00*** | (2006.01) |
| ***F25D 16/00*** | (2006.01) |
| ***F25D 23/00*** | (2006.01) |
| ***B67D 1/08*** | (2006.01) |
| *B67D 1/00* | (2006.01) |
| *B67D 1/04* | (2006.01) |

(52) U.S. Cl.

CPC ............ *F25D 16/00* (2013.01); *B67D 1/004* (2013.01); *B67D 1/0864* (2013.01); *F25D 23/006* (2013.01); *B67D 1/0034* (2013.01); *B67D 1/0406* (2013.01)

(58) Field of Classification Search

CPC .. B67D 1/0859; B67D 1/0034; B67D 1/0406; F25D 16/00; F25D 23/006

USPC ...................................... 222/255, 129.1, 135

See application file for complete search history.

(56) References Cited

U.S. PATENT DOCUMENTS

| | | | | | |
|---|---|---|---|---|---|
| 3,998,070 | A * | 12/1976 | Mueller | B67D 1/0864 | 62/393 |
| 4,610,145 | A * | 9/1986 | Arzberger | B67D 1/0028 | 222/146.1 |
| 4,962,866 | A * | 10/1990 | Phillips | G07F 5/18 | 221/8 |
| 5,112,477 | A * | 5/1992 | Hamlin | B01D 61/08 | 210/102 |
| 5,190,188 | A * | 3/1993 | Credle, Jr. | B67D 1/0021 | 222/1 |
| 5,314,091 | A * | 5/1994 | Credle, Jr. | B67D 1/0021 | 222/129.1 |
| 5,664,436 | A * | 9/1997 | Hawkins, Jr. | B67D 1/06 | 222/129.1 |

(Continued)

FOREIGN PATENT DOCUMENTS

WO WO 9221607 A1 12/1992

OTHER PUBLICATIONS

International Search Report of the Patent Cooperation Treaty, issued in PCT/US2017/028603, dated Jul. 18, 2017, 2 pages.

*Primary Examiner* — Jeremy W Carroll

(74) *Attorney, Agent, or Firm* — Sterne, Kessler, Goldstein & Fox P.L.L.C.

(57) ABSTRACT

A post-mix beverage dispenser having all components within an insulated housing is provided. The beverage dispenser can include an insulated housing with interior compartments that contain all complementary for dispensing a beverage, a carbonated beverage, and ice. The interior compartments can contain a concentrate source, a concentrate pump, an ice bin, an ice dispensing mechanism, a refrigeration system, a diluent pump, and a carbonation system.

12 Claims, 18 Drawing Sheets

(56) References Cited

U.S. PATENT DOCUMENTS

| | | | | |
|---|---|---|---|---|
| 6,761,036 | B2 * | 7/2004 | Teague | A23G 9/28 222/129.1 |
| 7,305,847 | B2 * | 12/2007 | Wolski | B67D 1/0003 222/146.6 |
| 2008/0083780 | A1 * | 4/2008 | Romanyszyn | B67D 1/0025 222/129.1 |
| 2009/0278024 | A1 * | 11/2009 | Shaji | F25C 5/182 248/678 |

* cited by examiner

REFRIGERATED POST-MIX DISPENSER

BACKGROUND

Field

Embodiments of the present invention relate to a refrigerated post-mix dispenser that utilizes components entirely within the system.

Background

Post-mix dispensers typically permit a beverage to be created on-demand from a mixture of ingredients. An advantage of dispensing beverage in this form is that the concentrate containers and water supply typically occupy significantly less space than is otherwise required to store the same volume of beverage in individual containers. Moreover, this dispensing equipment eliminates increased waste formed by the empty individual containers as well as additional transport costs. These and other technological advances have allowed food and beverage vendors to offer more diverse choices to consumers through post-mix dispensing systems.

Typically, post-mixed beverage systems store beverage concentrates at a remote pumping station, i.e., backroom package (BRP), for pumping to a dispenser. These beverage concentrates are rapidly chilled prior to dispensing the finished beverage to the user.

BRIEF SUMMARY OF THE INVENTION

One aspect of the invention permits a post-mix dispensing system that eliminates the need for a remote pumping station because the beverage concentrates are chilled continuously within their packaging. Continuously chilling the beverage concentrates can also reduce the need for preservatives in the beverage concentrates. An aspect of the present invention can include gas or electric powered diaphragm concentrate pumps within the beverage dispensing system that pump pre-chilled beverage concentrate to a dispensing nozzle.

In one aspect of the invention, the post-mix beverage dispensing system can include all components within an outer housing, thus limiting inputs and reducing installation time. In an aspect, the post-mix dispenser can include a refrigeration system to cool interior portions of the outer housing, an ice bank and water bath to cool incoming diluent sources and/or concentrate sources, a concentrate pump, a tank carbonation system, and an ice distribution system. The refrigeration system evaporator coil to cool interior portions of the outer housing can be cooled by a recirculation pump running cold water from the ice bank and water bath. In another aspect, the evaporator coil can be cooled by a refrigerant line in series with the evaporator coil in the ice bath. In a further aspect, the evaporator coil can be cooled by a secondary refrigeration system for additional cooling power, for example, a remote glycol chilling system.

In a further aspect of the invention, a post-mix beverage dispensing system can include a housing having a top wall, a bottom wall, a first side wall, a second side wall, a back wall, and a front door. The housing can include a first compartment having a water bath, an ice bank, a coil pack, and a first evaporator coil; a second compartment having a concentrate source, an ice bin, a second evaporator coil, and an evaporator fan; and a third compartment having a carbonator pump, a carbonator tank, a compressor, a condenser coil, and a condenser fan. The post-mix beverage dispensing system can include a refrigeration system disposed entirely within the housing to reduce the temperature within the first compartment and the second compartment. The refrigeration system can include the first evaporator coil, the second evaporator coil in series with the first evaporator coil, the evaporator fan, the compressor, the condenser coil, and the condenser fan. The post-mix beverage dispensing system can also include a dispensing nozzle. The coil pack can include a water conduit, a carbonated water conduit, and a concentrate conduit. The concentrate conduit can be fluidly connected to the concentrate source and the dispensing nozzle. Components of the refrigeration system can be part of a modular system and placed on a removable drop in deck that is placed inside the water bath. For example, the first evaporator coil, the compressor, the condenser coil, and the condenser fan can be attached to a refrigeration system deck such that the first evaporator coil is immersed in the water bath. In another aspect, other system components can also be part of a modular system and placed on a removable drop in deck. For example, the coil pack, carbonator tank, and carbonator pump can be attached to a carbonator deck such that the coil pack and lower portions of the carbonator tank are immersed in the water bath.

In another aspect of the invention, a post-mix beverage dispensing system can include an insulated housing and a refrigeration system positioned within the insulated housing. The refrigeration system can include a first evaporator coil, a second evaporator coil in series with the first evaporator coil, an evaporator fan, a compressor, a condenser coil, and a condenser fan. The dispensing system can include a beverage diluent within a diluent conduit, such that a portion of the diluent conduit is cooled by the first evaporator coil, a water bath, and an ice bank. The dispensing system can also include a beverage concentrate within a concentrate container positioned within an interior area of the housing that is cooled by the second evaporator coil and the evaporator fan. The dispensing system can include an ice bin positioned within the interior area of the housing, and an ice conveying, mechanism that can dispense ice from the ice bin.

In a further aspect, a method for dispensing a beverage from a post-mix beverage dispensing system can include providing an insulated housing that includes a first interior compartment having a water bath, an, ice bank, a coil pack, and a first portion of a refrigeration system, a second interior compartment having a concentrate within a concentrate container, ice within an ice bin, and a second portion of a refrigeration system, and a third interior compartment having a third portion of a refrigeration system. The method can further include fluidly connecting the concentrate container to a dispensing nozzle positioned on the insulating housing, and fluidly connecting a diluent source to a diluent conduit in the insulated housing. A portion of the diluent conduit can pass through the first interior compartment in the coil pack, fluidly connecting the diluent conduit to the dispensing nozzle. The method can include mixing the beverage concentrate and a diluent from the diluent source at the dispensing nozzle to dispense a beverage.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
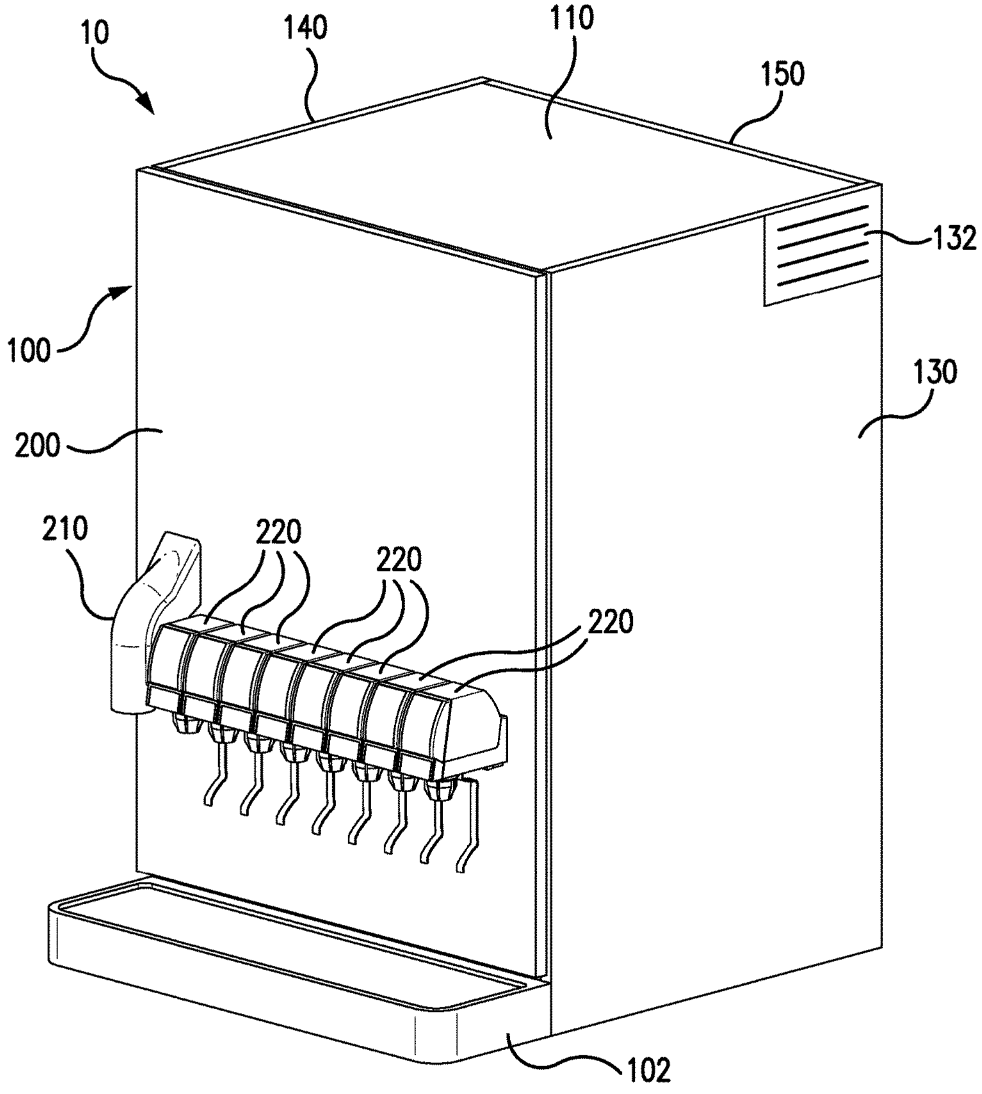
FIG. 1 is a perspective view of a beverage dispensing system according to various aspects of the invention.
Figure 2:
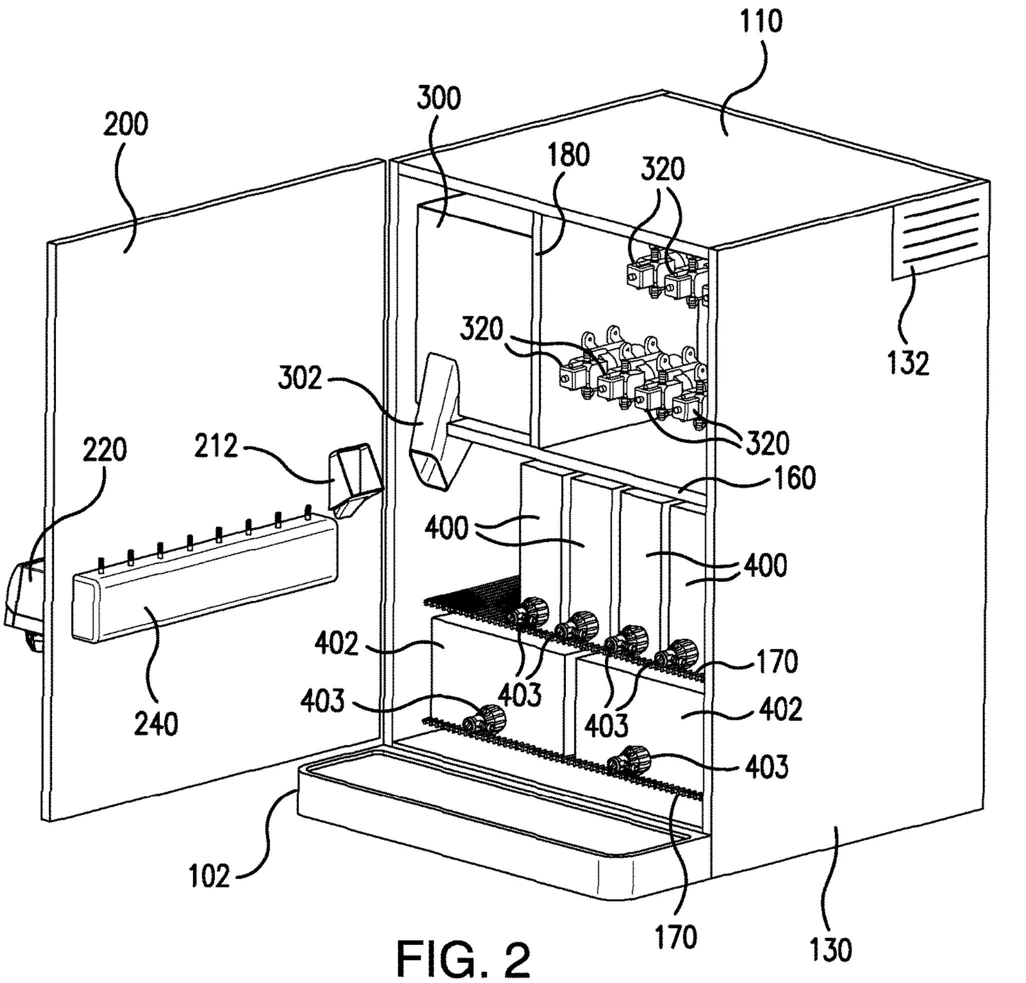
FIG. 2 is a perspective view of a beverage dispensing system according to various aspects of the invention.
Figure 3:
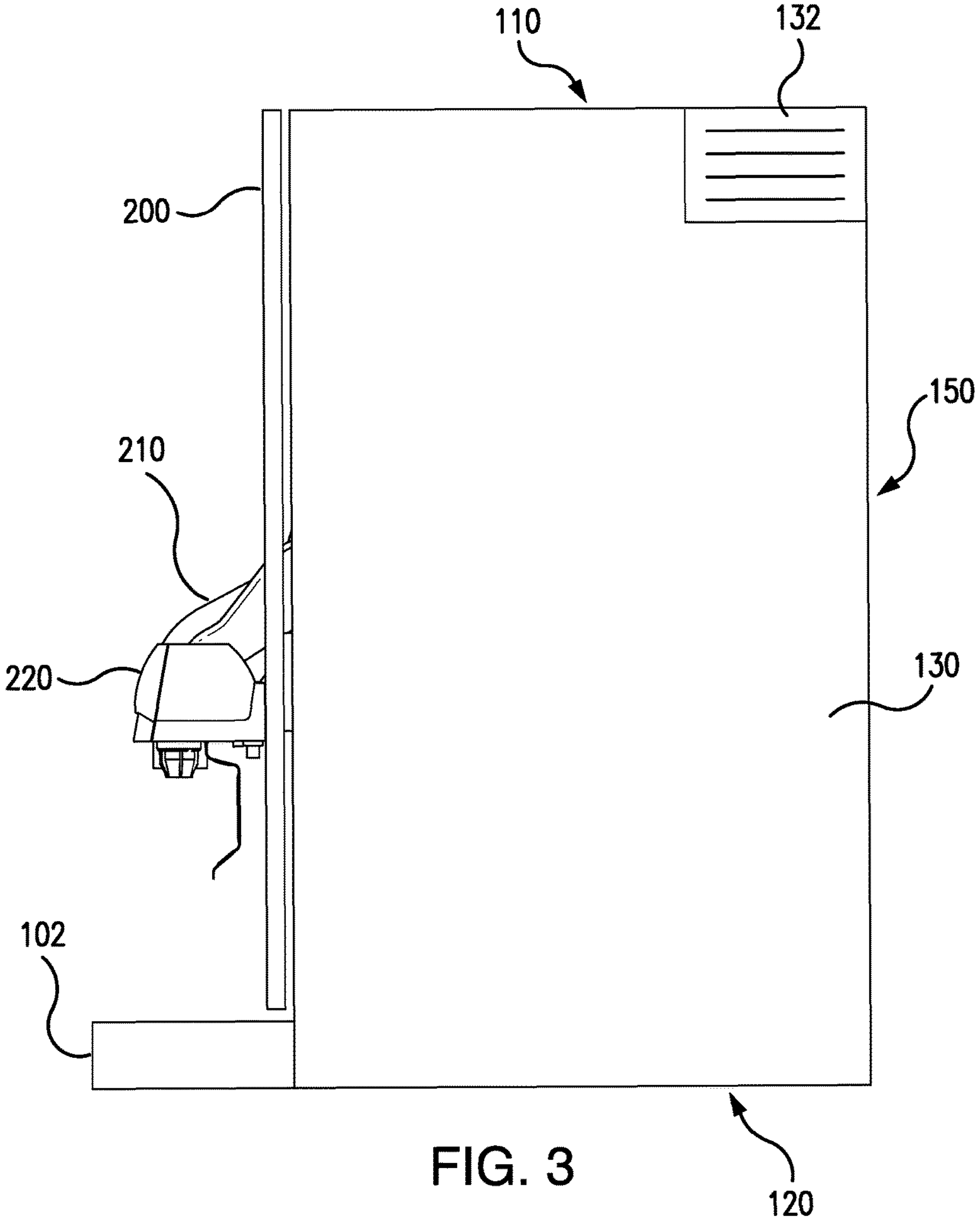
FIG. 3 is a side view of a beverage dispensing system according to various aspects of the invention.
Figure 4:
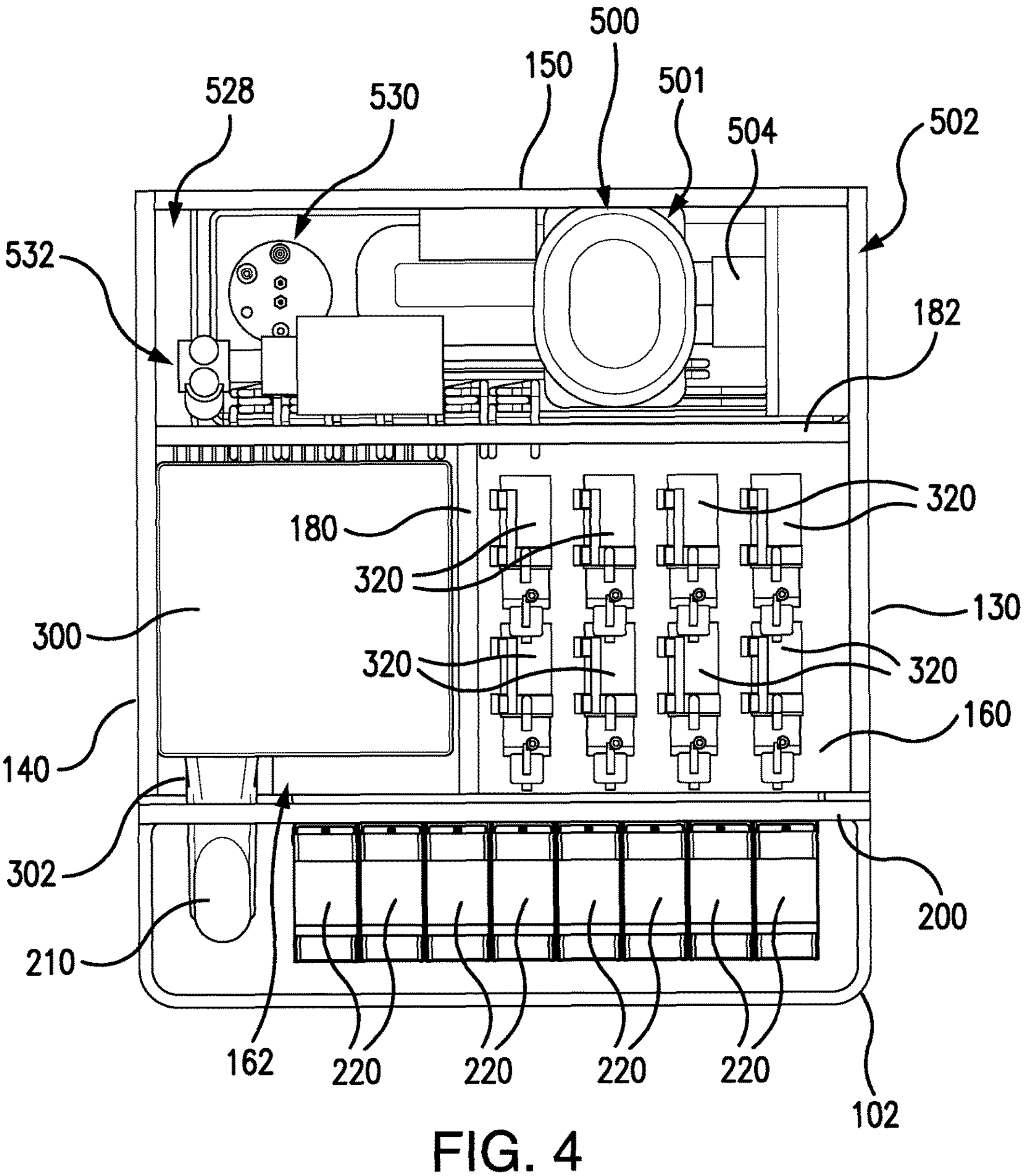
FIG. 4 is a top view of a beverage dispensing system according to various aspects of the invention.
Figure 5:
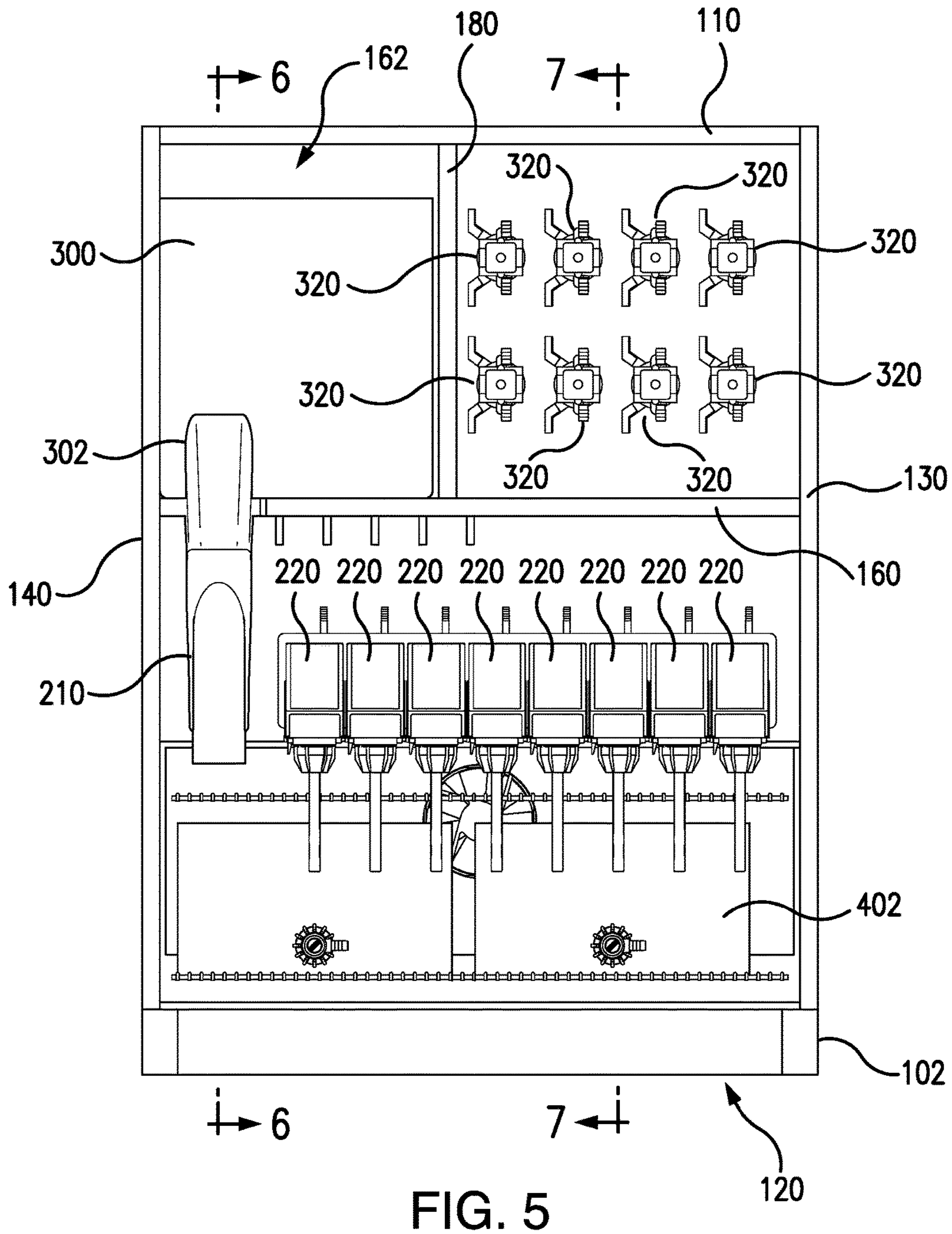
FIG. 5 is a front view of a beverage dispensing system according to various aspects of the invention.
Figure 6:
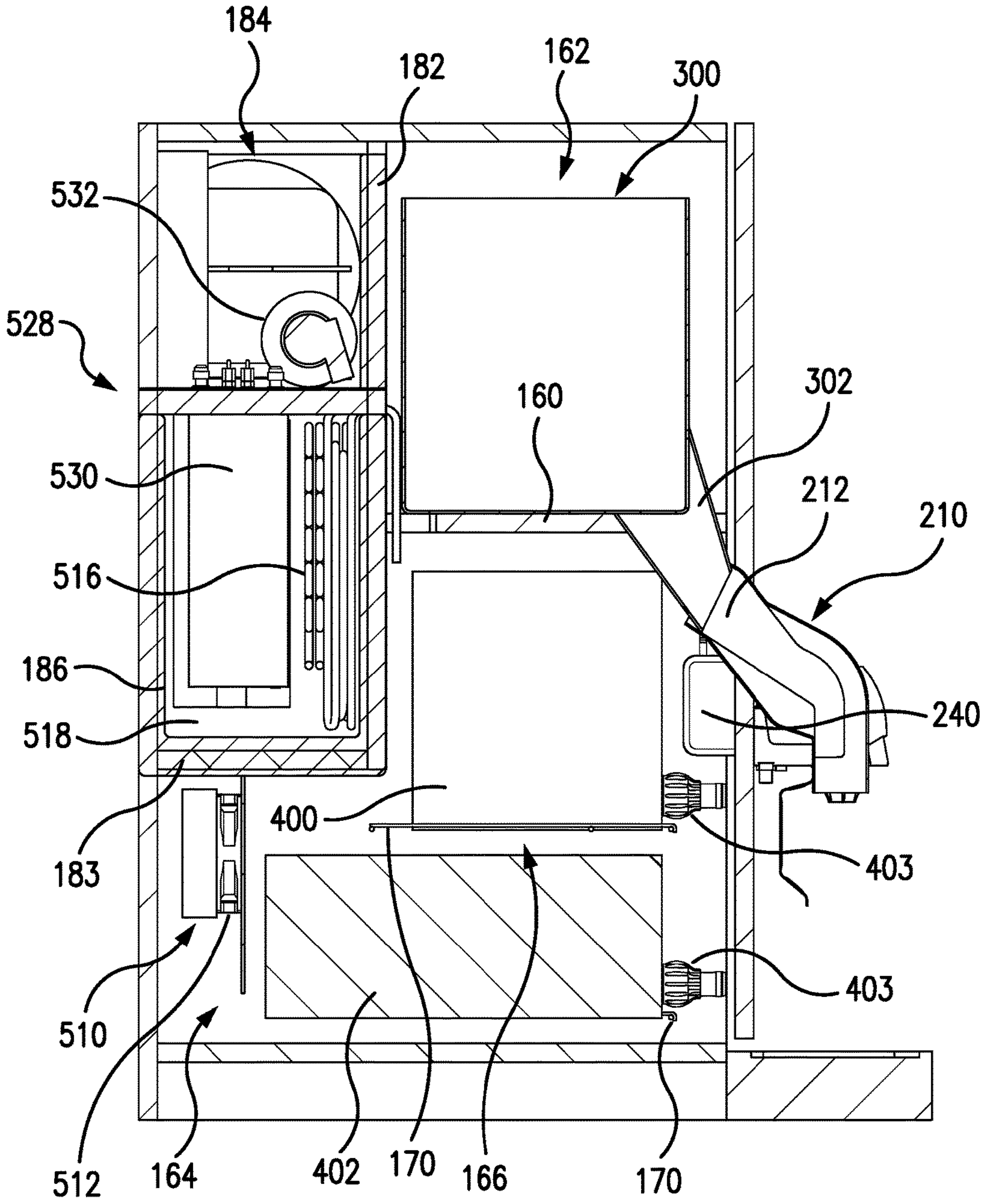

FIG. 6. is a fragmentary cross-sectional view of a beverage dispensing system taken along line 6-6 in FIG. 5.

Figure 7:
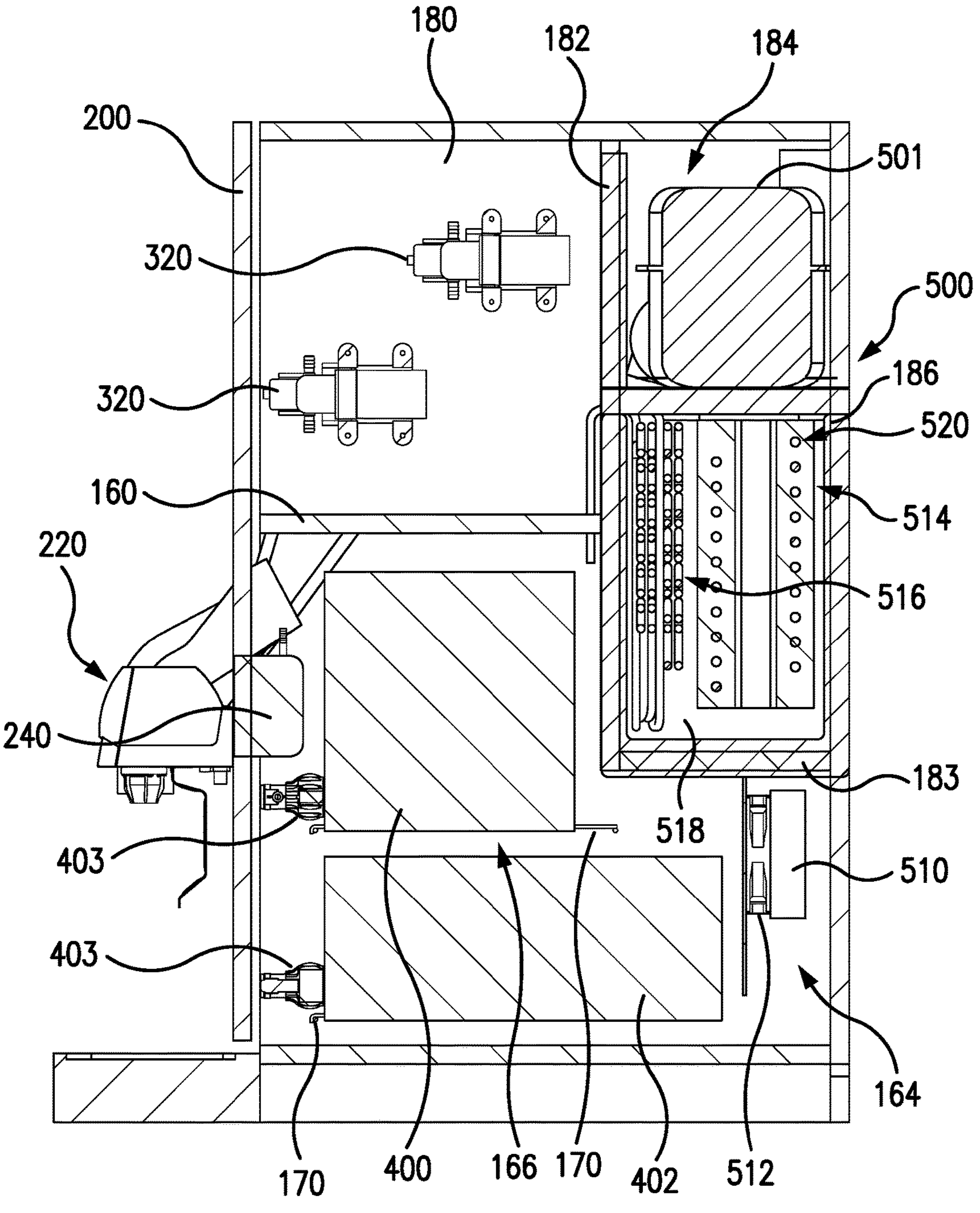

FIG. 7. is a fragmentary cross-sectional view of a beverage dispensing system taken along line 7-7 in FIG. 5.

Figure 8:
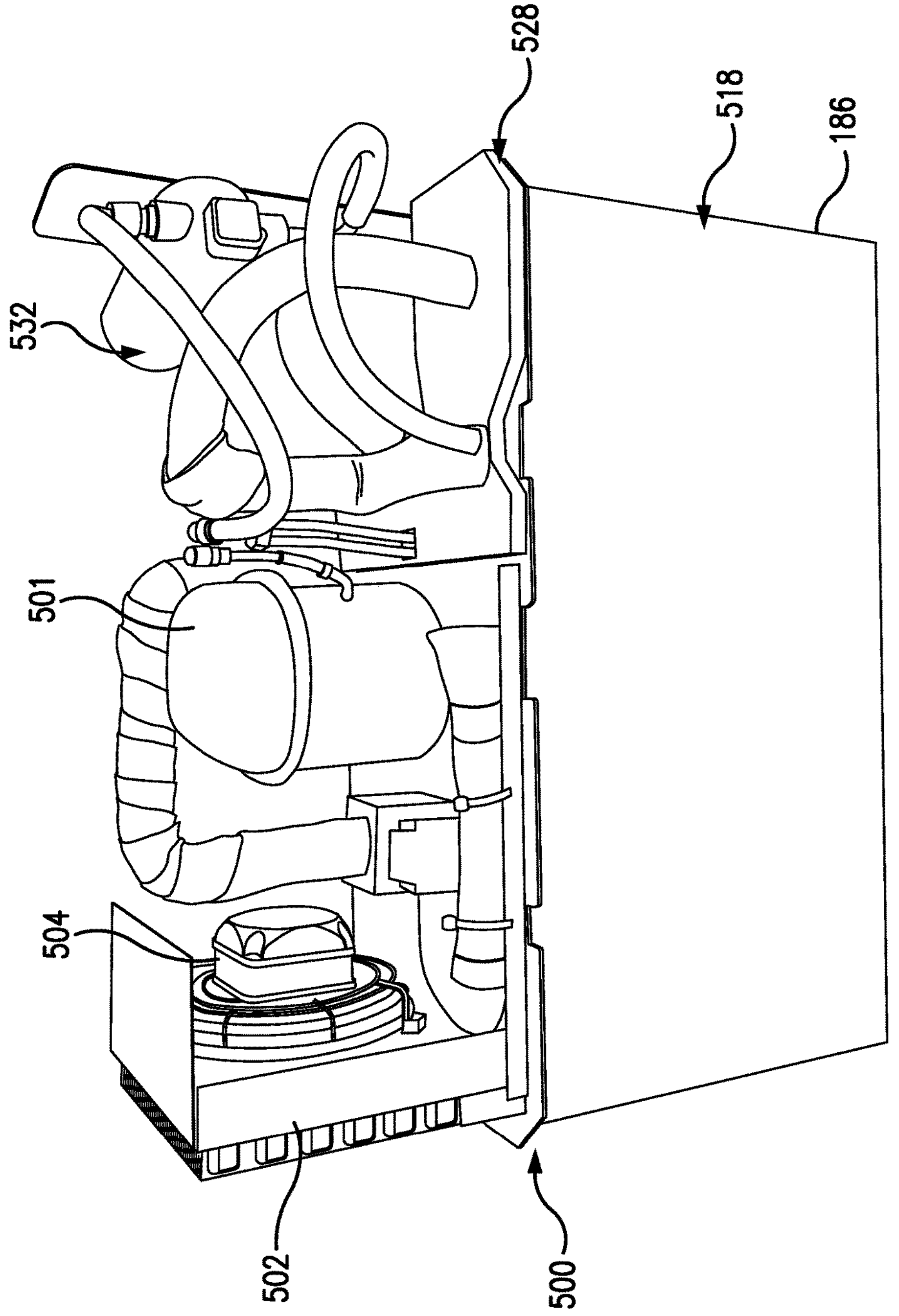

FIG. 8 is a front view of a carbonator system deck and a refrigeration system deck according to various aspects of the invention.

Figure 9:
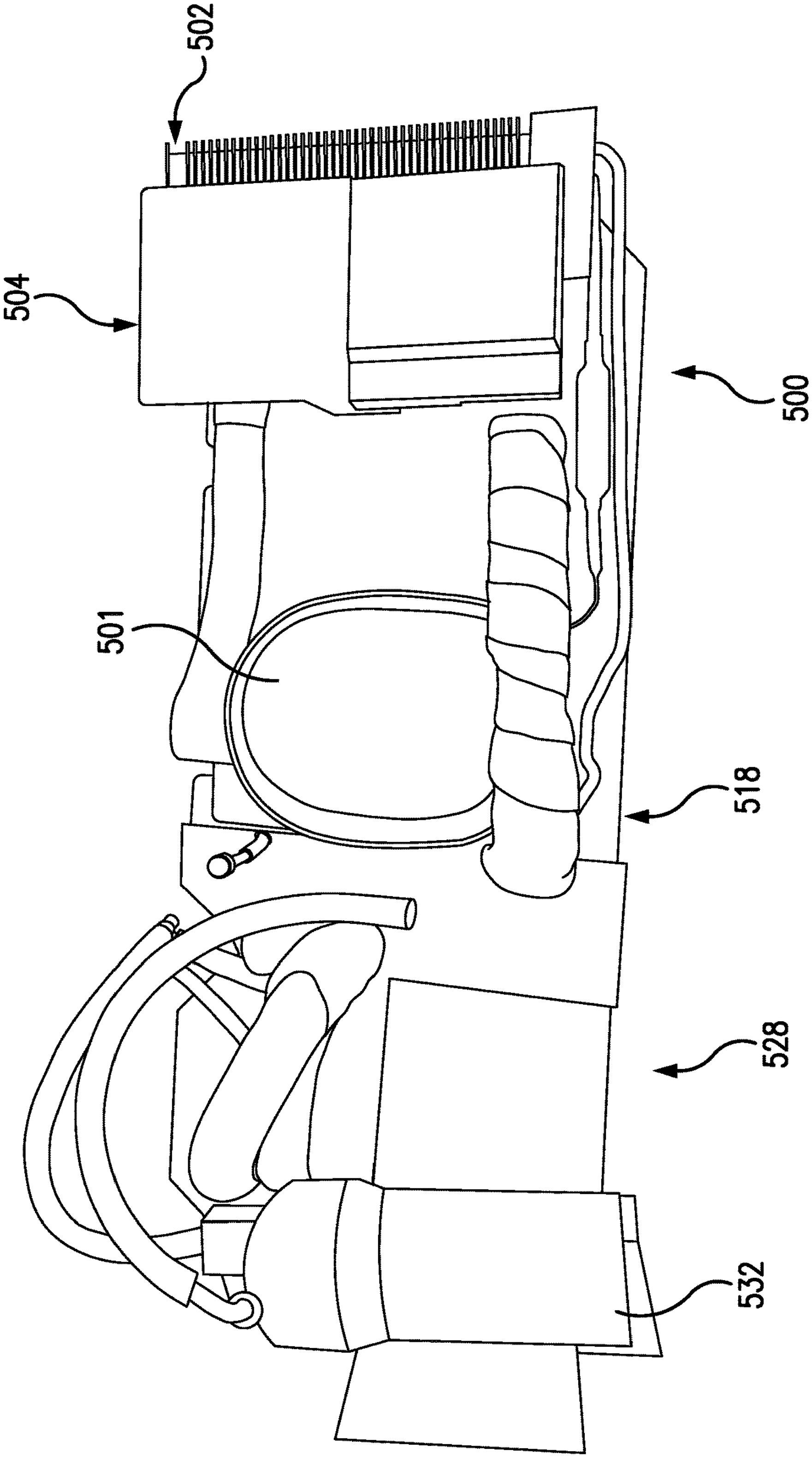

FIG. 9 is a top view of a carbonator system deck and a refrigeration system deck according to various aspects of the invention.

Figure 10:
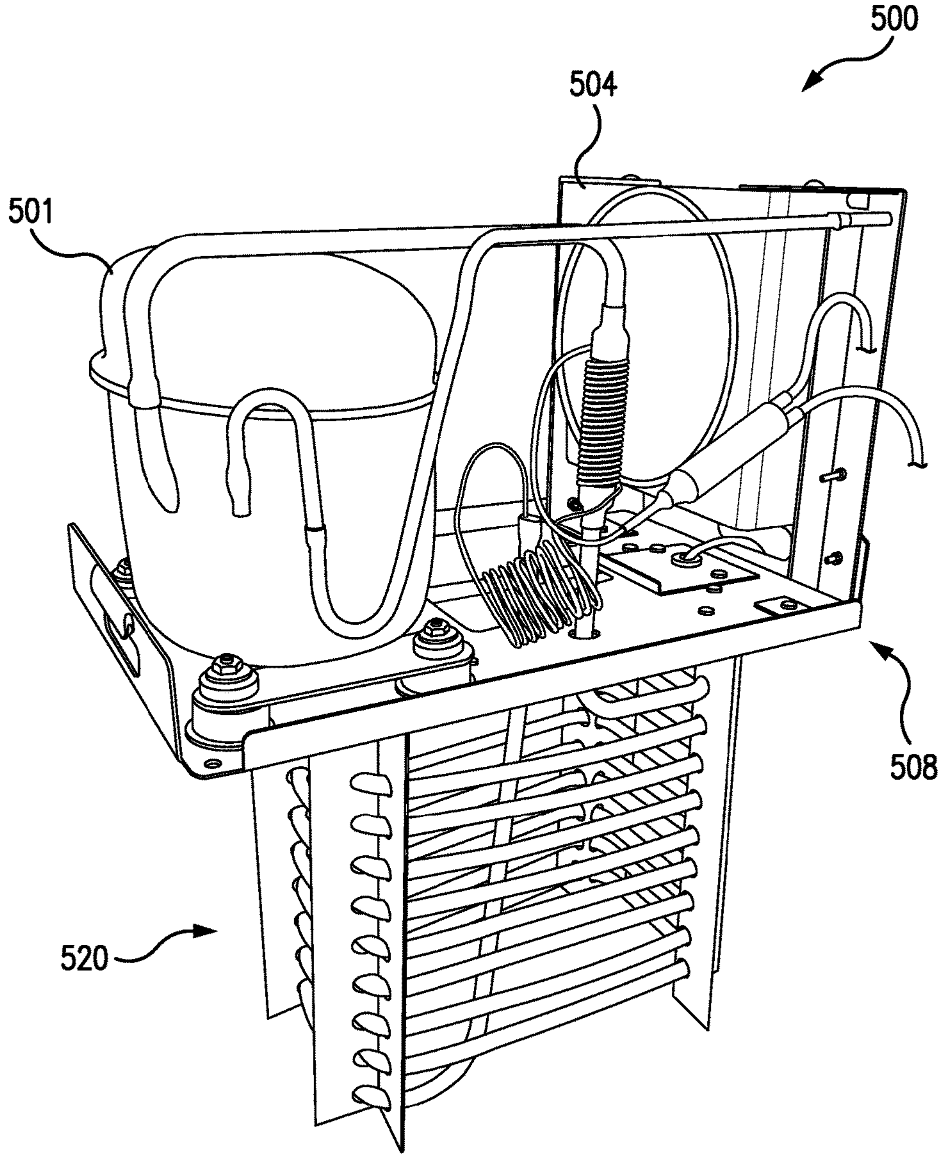

FIG. 10 is a perspective view of a refrigeration system deck according to various aspects of the invention.

Figure 11:
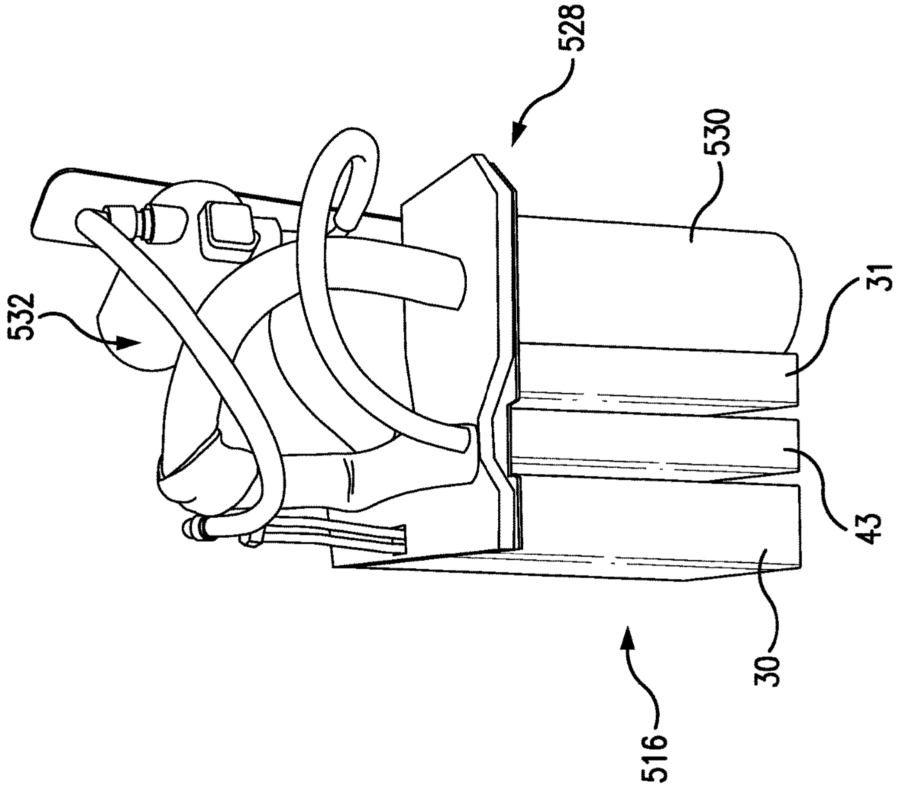

FIG. 11 is a perspective view of a carbonator system deck according to various aspects of the invention.

Figure 12:
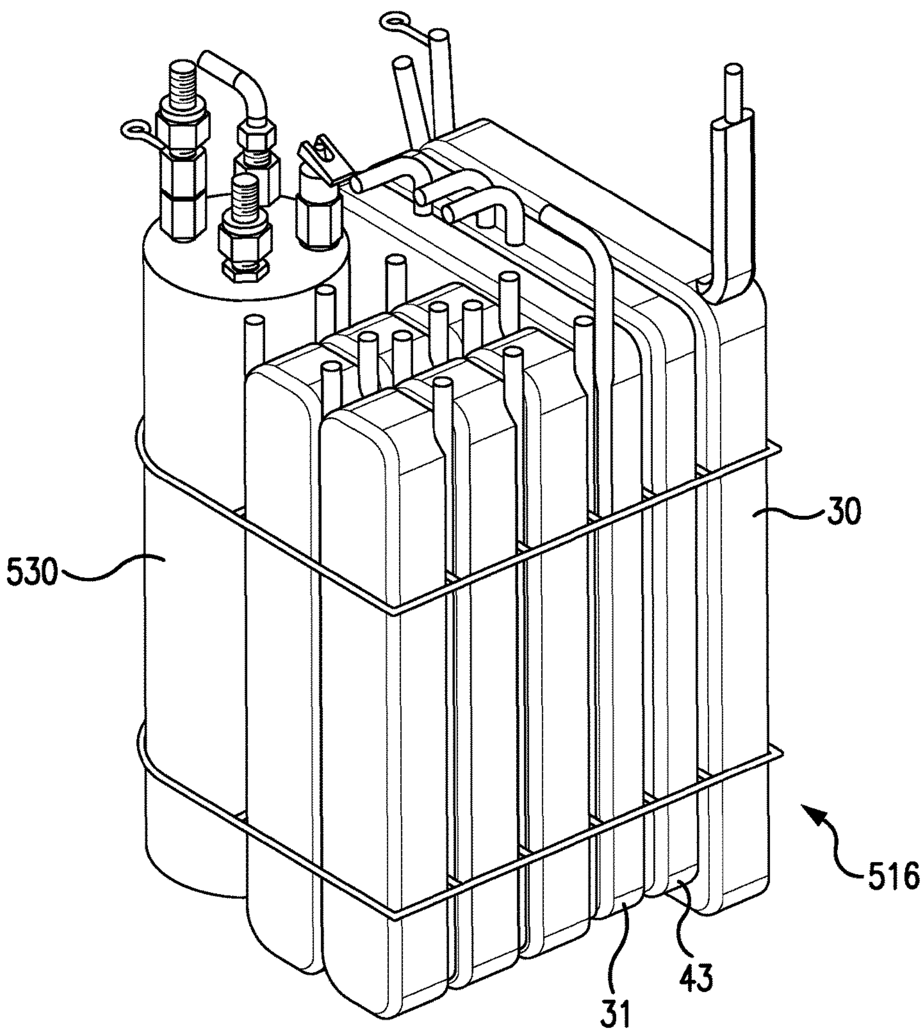

FIG. 12 is a perspective view of the coil pack and carbonator tank, according to various aspects of the invention.

Figure 13:
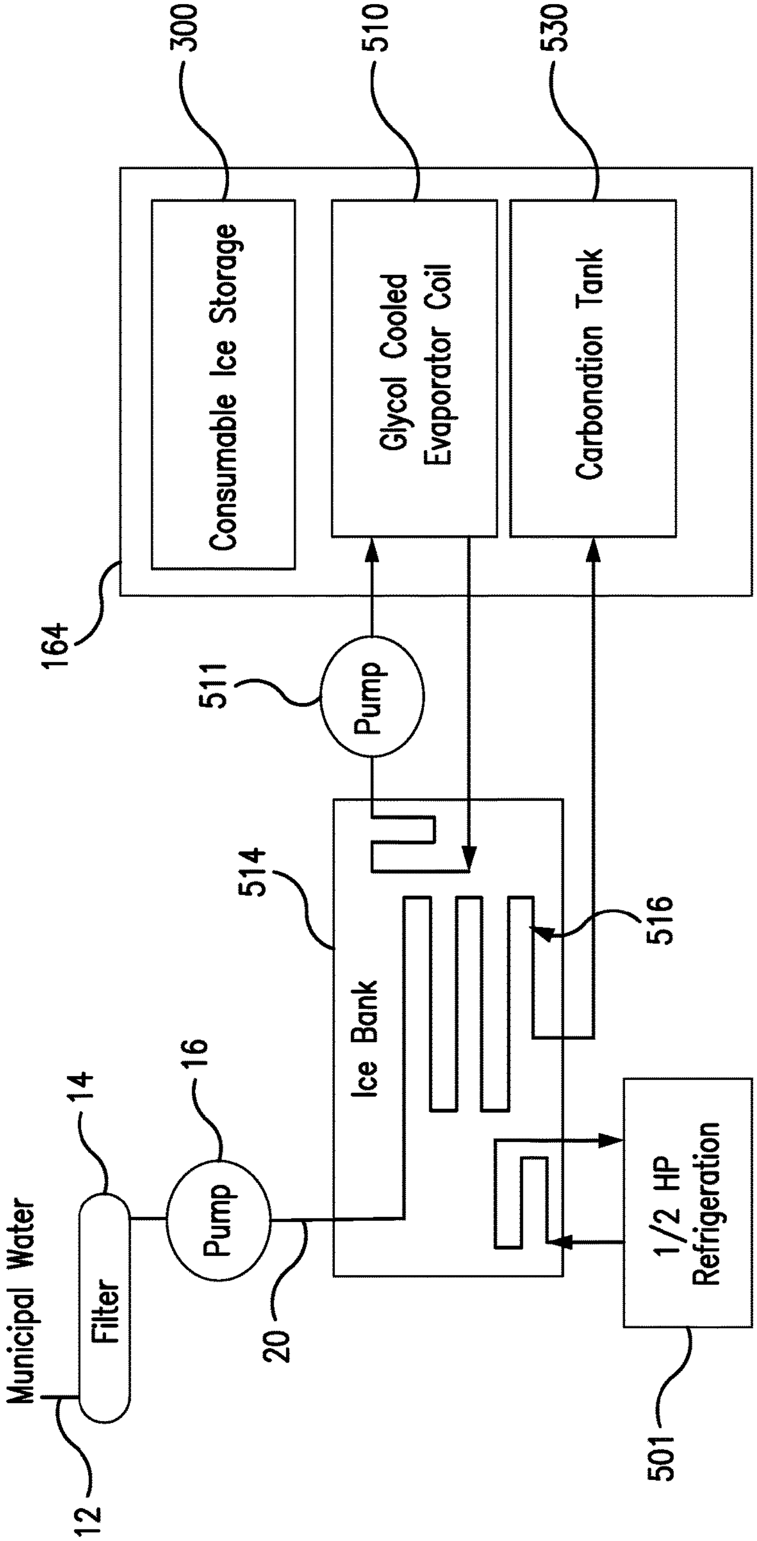

FIG. 13 is a schematic view of the refrigeration system to cool interior portions of the outer housing according to various aspects of the invention.

Figure 14:
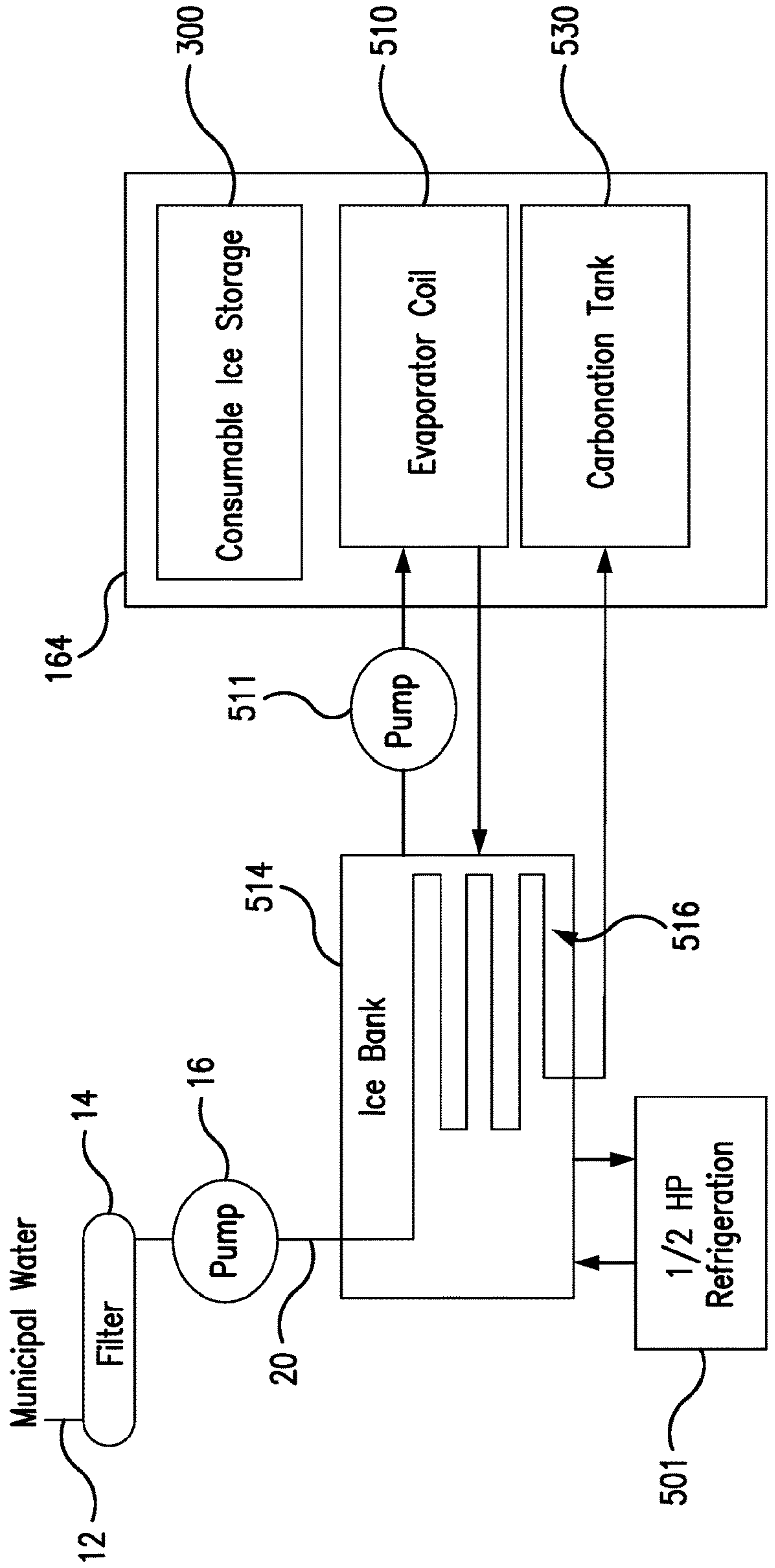

FIG. 14 is a schematic view of the refrigeration system to cool interior portions of the outer housing according to various aspects of the invention.

Figure 15:
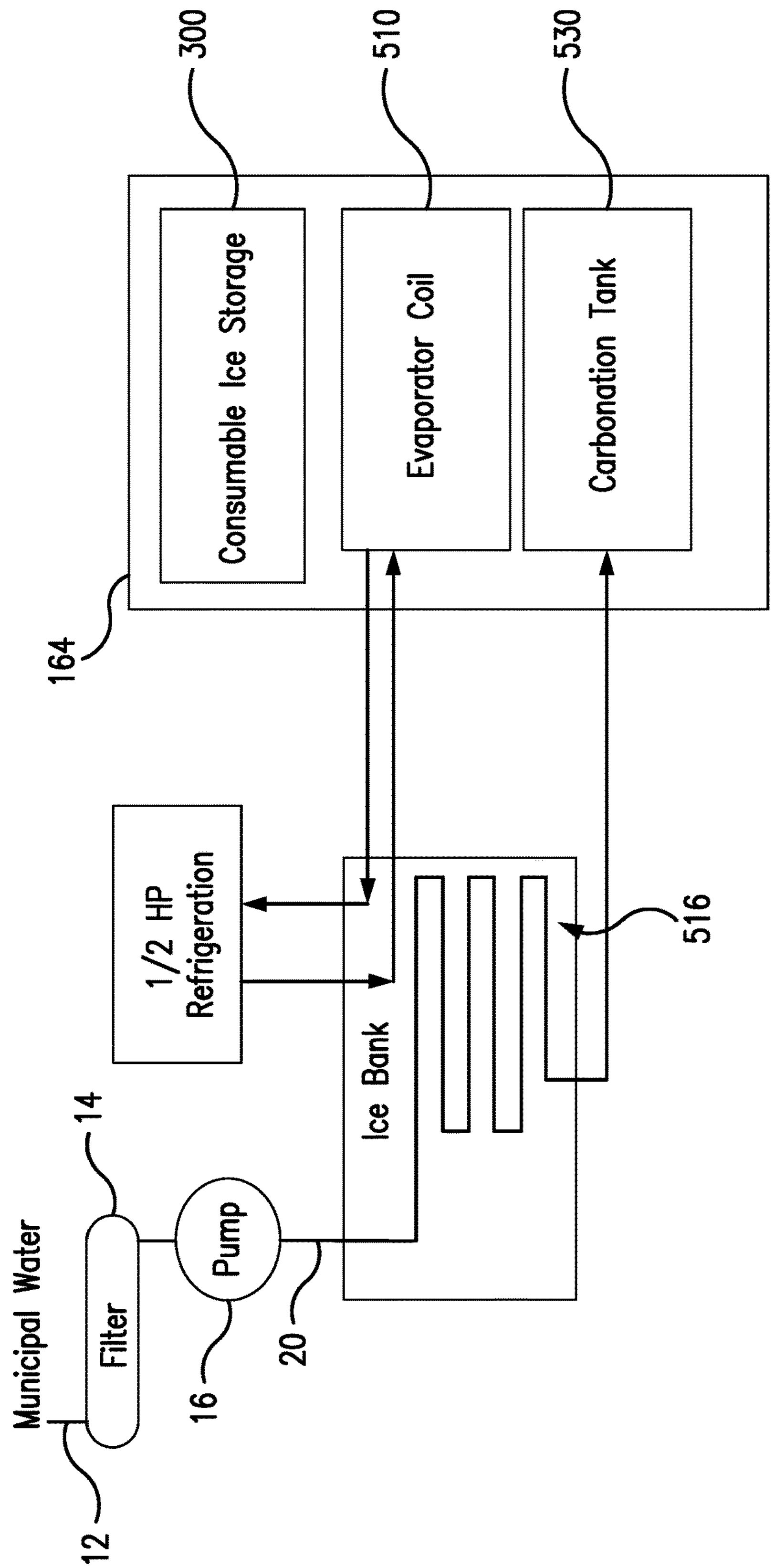

FIG. 15 is a schematic view of the refrigeration system to cool interior portions of the outer housing according to various aspects of the invention.

Figure 16:
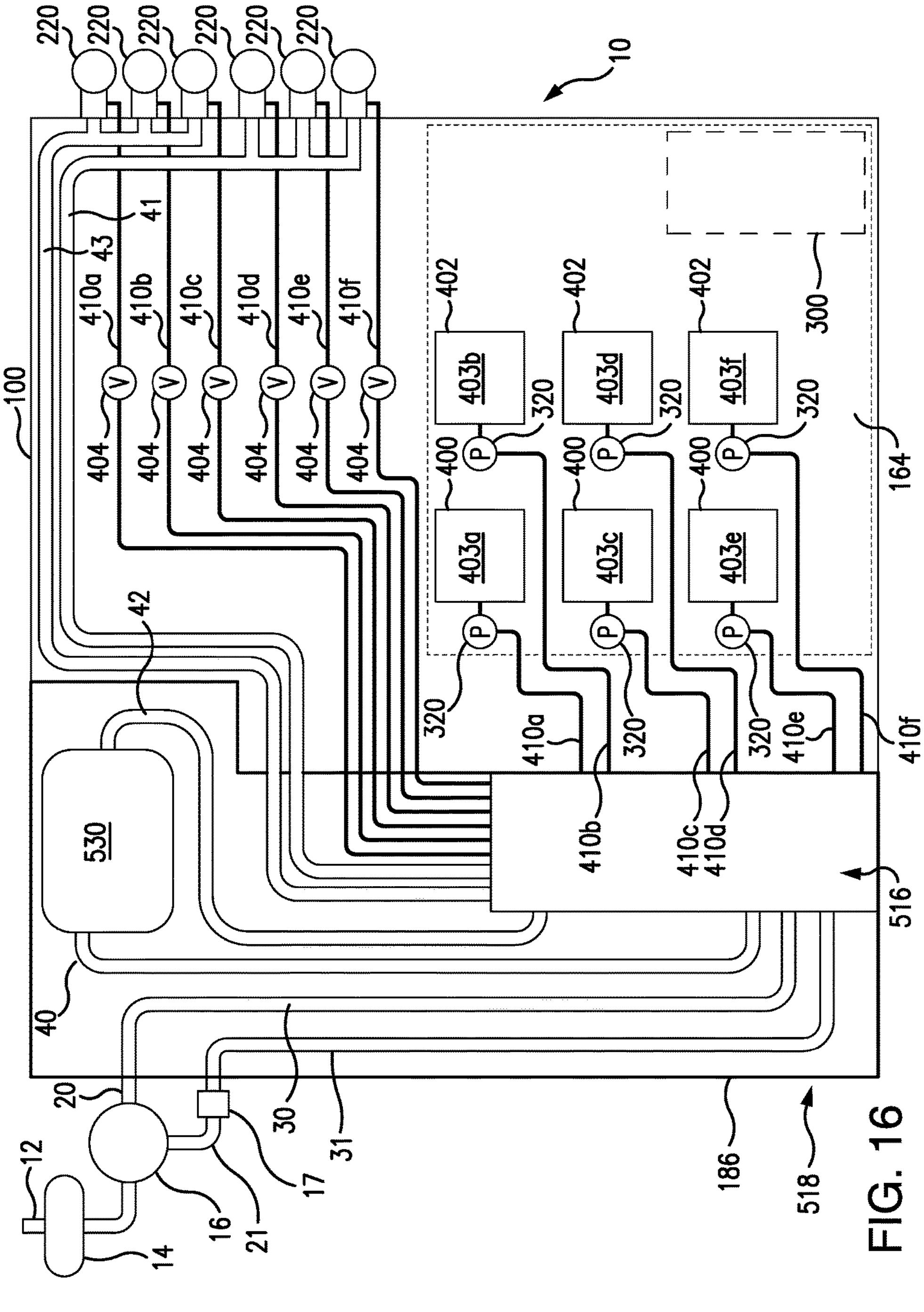

FIG. 16 is a schematic view of a beverage dispensing system according to various aspects of the invention.

Figure 17:
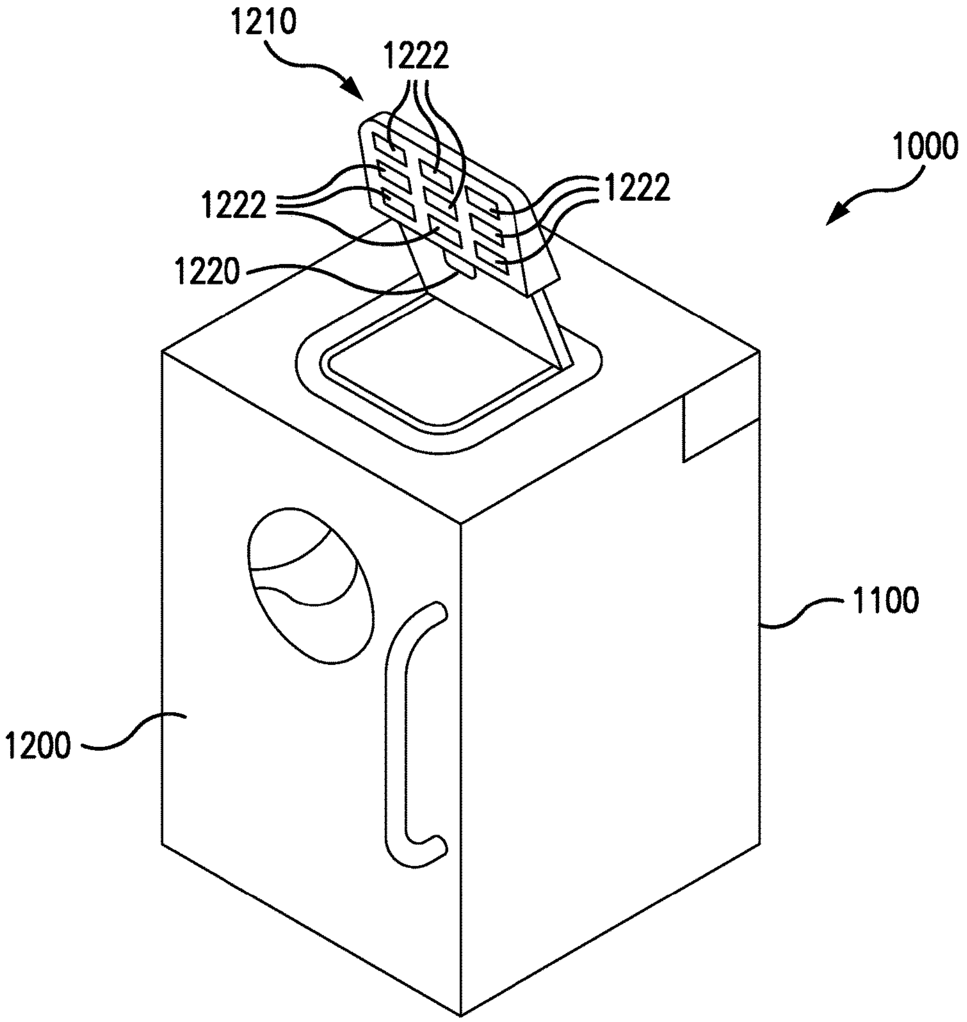

FIG. 17 is a perspective view of a beverage dispensing system according to various aspects of the invention.

Figure 18:
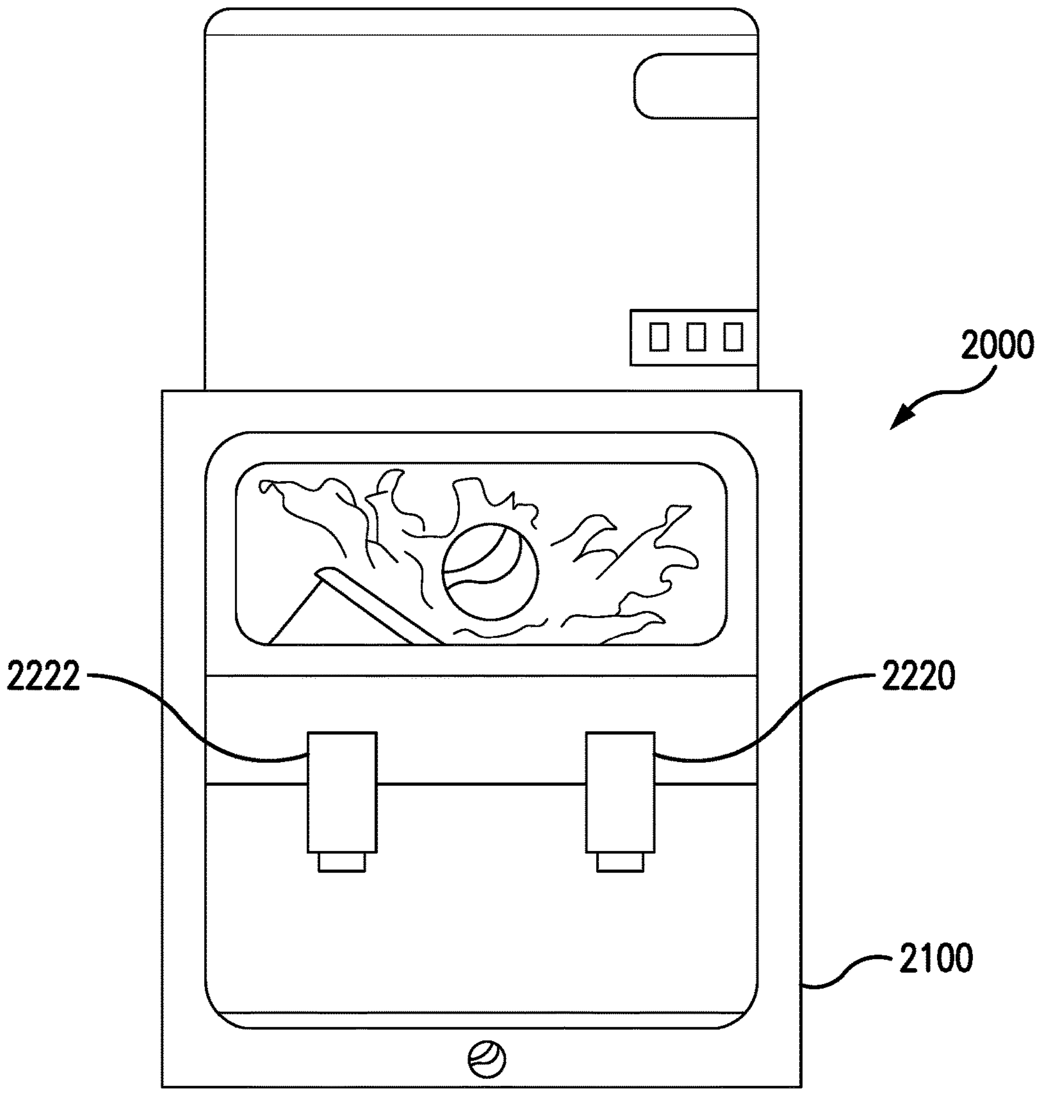

FIG. 18 is a perspective view of a beverage dispensing system according to various aspects of the invention.

Features and advantages of the embodiments will become more apparent from the detailed description set forth below when taken in conjunction with the drawings, in which like reference characters identify corresponding elements throughout.

DETAILED DESCRIPTION OF THE INVENTION

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An aspect of the present invention will now be described with reference to FIGS. 1-8. Throughout the system, conventional beverage tubing (FDA approved for use with food products) is used to connect the components of the system. Any of the beverage tubing conduits may be insulated to prevent heat loss or gain.

Beverage dispensing system 10 can include an outer housing 100 composed of a top wall 110, a bottom wall 120, side walls 130 and 140, a back wall 150, and a door 200. Interior horizontal wall 160, interior vertical wall 180, interior horizontal wall 181, interior vertical wall 182, and interior horizontal wall 183 car be positioned within outer housing 100. In an aspect, each of walls 110, 120, 130, 140, 150, and 160, 180, 181, 182, and 183 and door 200 can be insulated to prevent heat loss or gain through the respective wall.

Back wall 150, bottom wall 120, side walls 130 and 140, interior horizontal wall 160, interior vertical wall 180, interior wall 182, interior horizontal wall 183, top wall 110, and door 200 can define a cooled compartment 164 within outer housing 100. Cooled compartment 164 can be configured to contain portions of a refrigeration system, including, for example, an evaporator coil 520 and an evaporator fan motor and fan 512 to reduce the temperature of the interior of cooled compartment 164. Cooled compartment 164 can also be configured to contain concentrate sources 400 and 402, pumps 320, valves 404, and/or ice bin 300. Within cooled compartment 164, top wall 110, side wall 140, interior horizontal wall 160, interior vertical wall 180, interior vertical wall 182, and door 200 can define ice compartment 162 to hold ice bin 300.

Back wall 150, side walls 130 and 140, top wall 110, interior horizontal wall 181, and interior vertical wall 182 can define an interior compartment 184. In an aspect of the invention, interior compartment 184 can contain portions of a refrigeration system, including a compressor 500, a condenser coil 502, and a condenser fan motor and fan 504. Interior compartment 184 can also contain a carbonator pump 532 and a carbonator tank 530.

Back wall 150, side walls 130 and 140, interior horizontal wall 181, interior vertical wall 182, and interior horizontal wall 183 can define a compartment to contain water bath housing 186. In an aspect of the invention, water bath housing 186 can be configured to house portions of a refrigeration system, including an ice bank 514, a coil pack 516, a water bath 518, and an evaporator coil 520.

In one aspect of the invention, door 200 can be opened in any suitable manner. For example, one side of door 200 can be hingedly attached to the beverage dispensing system 10 for door 200 to swing open to allow access to concentrate sources 400 and 402 and the other components within. Door 200 can include a handle for opening door 200. Door 200 can also include a drip tray 102 attached to the door. Drip tray 102 can also be attached to outer housing 100. In one aspect of the invention, dispensing nozzles 220 can be attached to door 200.

In another aspect of the invention, top wall 110 can be opened in, any suitable manner. For example, one side of top wall 110 can be hingedly attached to the beverage dispensing system 10 for top wall 110 to swing open to allow access to ice bin 300 and the other components within. In another aspect, top wall 110 can be completely removable from beverage dispensing system 10. Top wall 110 can include a handle for opening top wall 110.

In another aspect, as shown in FIG. 17, beverage dispensing system 1000 can include a dispenser tower 1210 that includes selection buttons 1222 and a dispensing nozzle 1220. Dispenser tower 1210 can be positioned on top of outer housing 1100 above door 1200. Fluids that are cooled within outer housing 1100 of beverage dispensing system 1000 can be provided to dispenser tower 1210 through a python connection.

In a further aspect, as shown in FIG. 18, beverage dispensing system 2000 can include multi-flavor dispensing nozzles 2220 and 2222 on a front portion or door of outer housing 2100. An ice chute can be co-axial to multi-flavor dispensing nozzles 2220 and 2222. Multi-flavor dispensing nozzles are discussed, for example, in U.S. application Ser. No. 15/016,466, which is incorporated herein by reference in its entirety.

Concentrate sources 400 and 402 can contain beverage concentrates for mixing with a diluent to create a beverage. Each of concentrate sources 400 and 402 can include a concentrate source valve 403 for connection to the beverage dispensing system 10. For example, concentrate conduits can be fluidly connected to each of concentrate sources 400 and 402 through concentrate source valves 403. Each of the respective concentrate conduits can be fluidly connected to a dispensing nozzle 220. Concentrate pumps 320 can be fluidly connected to each of the concentrate conduits to move the beverage concentrates through the concentrate conduits. Concentrate pumps 320 can be gas or electric powered diaphragm pumps. In another aspect, concentrate pumps 320 can be peristaltic pumps.

One or more of concentrate sources 400 and 402 can be contained within cooled compartment 164. In one aspect of the invention, concentrate sources 400 and 402 can be placed on an interior structure of compartment 164. In one aspect of the invention, the interior structure of compartment 164 can be a shelf, a tray, or a receptacle. Concentrate sources 400 and 402 can be concentrate within a bag that sits on the interior structure of compartment 164. In another aspect, concentrate sources 400 and 402 can be contained within a box, i.e., bag-in-box, that sits on the interior structure of compartment 164. For example, one, two, three, four, five, or, more of concentrate sources 400 can be contained within cooled compartment 164. In another aspect, one, two, three, four, five, or more of concentrate sources 402 can be contained within cooled compartment 164. Concentrate source 400 and concentrate source 402 can be different sizes, and in one aspect, concentrate source 402 can be larger than concentrate source 400. Because it is larger, concentrate source 402 can be used for a concentrate of a more popular beverage in beverage dispensing system 10. In one aspect of the invention, concentrate sources 400 and 402 can be disposable containers that can be removed from beverage dispensing system 10 when empty, for example, after beverage concentrate has been fully dispensed.

Beverage dispensing system 10 can include shelves 170 positioned in cooled compartment 164. Shelves 170 can be configured to hold concentrate sources 400 and 402. The shelves 170 can be attached to and supported by an inner structure that can include grooves, ridges, holes, or other attachment features. The shelves 170 can be made of any suitable material. For example, the shelves 170 can be made of plastic or metal. Shelves 170 can be a solid surface or may include apertures to allow air, liquid and debris to flow through. Any number of shelves 170 is contemplated within the scope of the invention, and can be dependent on the height of cooled compartment 164 and the height of the concentrate sources 400 and 402 within the beverage dispensing system 10. In another aspect, shelves 170 can slide forward to allow easier access to concentrate sources 400 and 402.

In one aspect, shelves 170 can be vertically spaced such that concentrate source 400 an be positioned above concentrate source 402 and channel 166 can be provided between concentrate source 400 and concentrate source 402. Cooled air can flow from evaporator coil 510 through channel 166 to facilitate cooling of concentrate source 400 and concentrate source 402. In another aspect, shelves 170 can be vertically spaced such that channel 168 is provided between concentrate source 402 and bottom wall 120. Cooled air can flow from evaporator coil 510 through channel 168 to facilitate cooling of concentrate source 400 and concentrate source 402.

In cooled compartment 164, evaporator fan motor and fan 512 can be positioned in a central portion between side walls 130 and 140. Evaporator fan motor and fan 512 can circulate reduced temperature air from evaporator coil 510 to cooled compartment 164 to maintain concentrate sources 400 and 402 at a reduced temperature. In one aspect, the interior temperature of cooled compartment 164 can be approximately 32 degrees Fahrenheit. In another aspect, evaporator fan motor and fan 512 can circulate reduced temperature air from evaporator coil 510 to ice compartment 162 to maintain ice bin 300 at a reduced temperature to prevent ice within ice bin 300 from melting. In one aspect, channel 166 can allow reduced temperature air to flow around and surround concentrate sources 400 and 402.

Ice bin 300 within ice compartment 162 can store ice for dispensing into a user's beverage. In one aspect, ice bin 300 can store up to approximately 30 to approximately 60 pounds of ice. In another aspect, ice bin 300 can store up to approximately 80 pounds of ice. Ice bin 300 can include an ice dispensing mechanism to dispense ice from beverage dispensing system 10. In one aspect, ice dispensing mechanism can include a rotating auger that conveys ice into ice chute 302 in ice bin 300. Ice chute 302 can be connected to interior door ice chute 212 positioned on an interior portion of door 200. Exterior door ice chute 210 can be positioned on an exterior portion of door 200. The ice dispensing mechanism, ice chute 302, interior door ice chute 212, and exterior door ice chute 210 can be connected to dispense ice from ice bin 300 into a user's beverage. The ice dispensing mechanism can also include an ice chute flap to insulate and retain the cooled air within cooled compartment 164. Ice chute 302, interior door ice chute 212, and/or exterior door ice chute 210 can include a channel to direct water from melted ice into drip tray 102.

In one aspect, insulation 240 can be provided on an interior portion of door 200 to protect water manifolds sand concentrate fittings from cool temperatures. The water manifolds and concentrate fittings can connect to nozzles 220.

As shown in FIGS. 6-10, the refrigeration system can include a refrigeration system deck 500 which can include compressor 501, condenser coil 502, condenser fan motor and fan 504, and evaporator coil 520. Refrigeration system deck 500 can be part of a modular system that can easily be removable from beverage dispensing system 10 for easier serviceability and maintenance. Refrigeration system deck 500 can be placed on a top portion of water bath housing 186 so that evaporator coil 520 is partially or completely immersed in water bath 518. The refrigeration system can also include evaporator coil 510 and evaporator fan motor and fan 512 to cool cooled compartment 164, as discussed in further detail below. The refrigeration system deck 500 can operate on a conventional vapor compression cycle to maintain the fluids in beverage dispensing system 10 at a desired temperature. In the vapor compression cycle, the refrigerant in the vapor phase can be compressed in compressor 501 resulting in an increase in temperature. Next, the hot, high-pressure refrigerant can be circulated through condenser coil 502 where it can be cooled by heat transfer to the surrounding air. Because of the heat transfer to the surrounding air, the refrigerant can condense back to a liquid from the gas phase. The refrigerant can then pass through a throttling, device that can reduce the pressure and temperature of the refrigerant. The cold refrigerant can leave the throttling device and enter evaporator coil 520 in water bath 518 to generate ice bank 514 surrounding evaporator coil 520. Refrigeration system deck 500 can also include a probe 508 that senses whether sufficient ice has built up in ice bank 514 to maintain the temperature of the fluids in coil pack 516 at the desired temperature. When sufficient ice is built up in ice bank 514, a portion of probe 508 is embedded in the ice. Ice has a higher resistance than that of water, so a refrigeration system control (not shown) that is connected to probe 508 shuts off compressor 501 in the refrigeration system in response to the high resistance imposed by the ice surrounding probe 508. When ice bank 514 melts so as to lower the resistance between probe 508 and the ground created by metal water bath housing 186, the circuit will reactivate compressor 501 and the refrigeration system to build up additional ice in ice bank 514 until the probe 508 is again embedded in ice. In this system, the compressor is turned off when the ice bank 514 is sufficiently built-up to adequately cool the fluids in coil pack 516 and carbonator tank 530. This is to prevent ice bank 514 from becoming too large and freezing the fluids in coil pack 516 and carbonator tank 530. In one aspect, approximately eight or nine pounds of ice will build up in ice bank 514 to chill water bath 518 without freezing the fluids in coil pack 516 and carbonator tank 530.

An agitator motor (not shown) can have a bladed impeller that circulates the water in water bath 518 to transfer cooling energy from ice bank 514 to water bath 518 and in turn, the fluids within coil pack 516 and carbonator tank 530.

In one aspect, as shown in FIG. 14, evaporator coil 510 can be in series with evaporator coil 520 such that cold refrigerant can leave evaporator coil 520 and enter evaporator coil 510 to provide cooled air to cooled compartment 164. Heat transfer between the evaporator coils and the respective areas to be refrigerated causes the refrigerant to evaporate or change from a saturated mixture of liquid and vapor into a superheated vapor. The vapor leaving evaporator coil 510 can be drawn back into compressor 501 to repeat the cycle.

In another aspect, as shown in FIG. 12, evaporator coil 510 in cooled compartment 164 can be cooled by a remote glycol system for additional cooling power. In a further aspect, as shown in FIG. 13, evaporator coil 510 can be cooled by a recirculation pump 511 running cold water from water bath 518 and ice bank 514.

The refrigeration system deck 500 can use any suitable type of refrigerant to cool the beverage dispensing system 10. For example, R134A (tetraflouroethane), CO2 (carbon dioxide), or hydrocarbons may be used. The refrigeration components of refrigeration system deck 500 can be placed within outer housing 100 and separated as necessary by insulating material. In another aspect, some of the refrigeration components may be placed in separate enclosures within outer housing 100. For example, compressor 501, condenser coil 502, and condenser fan motor and fan 504 can be positioned within interior compartment 184. Evaporator coil 510 and evaporator fan motor and fan 512 can be positioned within cooled compartment 164. Evaporator coil 520 can be partially or completely submerged in water bath 518.

As shown in FIGS. 6-12, beverage dispensing system 10 can include a carbonator system deck 528 which can include the coil pack 516, carbonator tank 530, and carbonator pump 532. The coil pack 516 and carbonator tank 530 can be partially or completely immersed in water bath 518. Carbonator system deck 528 can be part of a modular system that can easily be removable from beverage dispensing system 10 for easier serviceability and maintenance. Carbonator system deck 528 can be placed on a top portion of water bath housing 186 so that at least a portion of coil pack 516 and carbonator tank 530 are immersed in water bath 518. In one aspect, carbonator system deck 528 can be adjacent refrigeration system deck 500 on water bath housing 186.

Water bath 518 and ice bank 514 can be provided in water bath housing 186. In an aspect, water bath housing 186 can be filled with water such that water bath 518 has a level above the top of the evaporator coil 520 to surround coil pack 516, and evaporator coil 520. In another aspect, water bath 518 can fill the entirety of water bath housing 186. Ice bank 514 and water bath 518 can cool diluent, carbonated diluent, and concentrates within respective conduits in coil pack 516, for example, to approximately 32 degrees Fahrenheit.

As shown in FIG. 15, in the beverage dispensing system 10, a pressurized diluent source 12 can supply diluent, e.g., water, to the beverage dispensing system 10. In one aspect, the diluent can be at typical domestic water pressures, e.g., approximately 50-300 pounds per square inch (psi). The diluent source 12 can provide diluent to a pump 16. In one aspect, pump 16 can be positioned on carbonator system deck 528. The diluent passes through filter 14 and into diluent conduits 20 and 21. Diluent passes through diluent conduit 21 into pressure transducer 17 to pressure condition the diluent through non-carbonated diluent conduits 31 and 41 to the valves and dispensing nozzles for appropriate water flow management. In one aspect of the invention, pressure transducer 17 prevents a water pressure drop in non-carbonated diluent conduits 31 and 41 when dispensing carbonated diluent through carbonated diluent conduit 43, thus allowing beverage dispensing system 10 to dispense a non-carbonated beverage and a carbonated beverage at the same time.

Non-carbonated diluent conduits 31 and 41 pass through water bath 518 and coil pack 516, where the non-carbonated diluent is cooled to a reduced temperature, for example, approximately 32 degrees Fahrenheit. In one aspect, non-carbonated diluent conduit 31 can have a number of tightly spaced turns within coil pack 516 to increase the volume of non-carbonated diluent within coil pack 516. Non-carbonated diluent conduit 41 can exit coil pack 516 and can deliver cooled diluent to one or more of dispensing nozzles 220 so that the non-carbonated diluent can be dispensed with a concentrate into a user's container, cup, or pitcher to dispense a beverage.

In order to form carbonated water or soda, diluent (water) is mixed with pressurized $CO_2$ gas and the level of carbonation is dependent on the water temperature and $CO_2$ pressure. The lower the water temperature, the more effectively the $CO_2$ is entrained and maintained in the diluent.

Pre-chill diluent conduit 30 enters coil pack 516 and can have a number of tightly spaced turns within coil pack 516 to increase the volume of diluent within coil pack 516. Chilled diluent exits coil pack 516 through supply conduit 40. Supply conduit 40 is connected to carbonator tank 530, where pressurized $CO_2$ gas is supplied to the diluent. The resulting carbonated diluent exits the carbonator tank 530 into conduit 42, which flows back into coil pack 516. Carbonated diluent is then supplied to a post-chill conduit, carbonated conduit 43.

The coils in coil pack 516 ensure that the water entering carbonator tank 530 is at the desired temperature, approximately 35 degrees Fahrenheit. The carbonated diluent is maintained at the desired temperature by sending the carbonated diluent through a post-chill section 43 in coil pack 516 before being dispensed from nozzles 220 so that the carbonated diluent can be dispensed with a concentrate into a user's container, cup, or pitcher to dispense a beverage.

In one aspect of the invention, beverage dispensing system 10 can include one or more concentrate sources 400 and one or more concentrate sources 402. In a further aspect, beverage dispensing system 10 car include three concentrate sources 400 and three concentrate sources 402. Pumps 320 can move concentrates 403*a*-403*f* from concentrate sources 400 and 402 through valves 403 and through concentrate conduits 410*a*-410*f*, respectively. In one aspect of the invention, concentrate conduits 410*a*-410*f* can pass into coil pack 516 in water bath 518 in water bath housing 186 where the concentrates 403*a*-403*f* are cooled to a reduced temperature, for example, approximately 32 degrees Fahrenheit. In one aspect, concentrate conduits 410*a*-410*f* can have a number of tightly spaced turns within coil pack 516 to increase the volume of concentrates 403*a*-403*f* within coil pack 516. Concentrate conduits 410*a*-410*f* can exit coil pack 516 and can deliver cooled concentrates 403*a*-403*f* to nozzles 220 so that the respective concentrates can be dispensed with a diluent or a carbonated diluent into a user's container, cup, or pitcher to dispense a beverage.

In a further aspect, concentrate conduits can bypass coil pack 516 and can deliver concentrates 403*a*-403*f* directly to nozzles 220.

In one aspect of the invention, beverage dispensing system 10 can be sized for placement on or below a countertop or table. In another aspect, beverage dispensing system 10 can be any shape, or size, suitable for housing and cooling the respective concentrate sources, diluent sources, and components within outer housing 100. The outer housing 100 can be generally rectangular or box shaped and may include curved or rounded surfaces. The outer housing 100 may be manufactured in a variety of colors. The color of the outer housing 100 may be indicative of a certain brand or type of merchandise and may be used to promote the brand or type of merchandise. For example, blue and red may be used to promote traditional Pepsi products; white and blue may be used to promote Diet Pepsi products; green may be used to promote non-carbonated beverages; and orange and may be used to promote Gatorade products. In another aspect of the invention, door 200 can include marketing and/or branding information. Door 200 can be easily removable so as to be interchangeable with another door having different marketing and/or branding information.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A post-mix beverage dispensing system comprising:

a housing having a top wall, a bottom wall, a first side wall, a second side wall, a back wall, and a front door, the housing including:

a first compartment having a water bath, an ice bank, a coil pack, and a first evaporator coil, a second compartment having a concentrate source, an ice bin, a second evaporator coil, and an evaporator fan, and a third compartment having a carbanator pump, a carbonater tank, a compressor, a condenser coil, and a condenser fan;

a refrigeration system disposed entirely within the housing to reduce the temperature within the first compartment and the second compartment, the refrigeration system including the first evaporator coil, the second evaporator coil, the evaporator fan, the compressor, the condenser coil, and the condenser fan; and a dispensing nozzle, wherein water from the water bath is circulated to the second evaporator coil, wherein the coil pack includes a water conduit, a carbonated water conduit, and a concentrate conduit, and wherein the concentrate conduit is fluidly connected to the concentrate source and the dispensing nozzle.

2. The post-mix beverage dispensing system of claim 1, wherein the carbonated water conduit is fluidly connected to the carbonator tank and the dispensing nozzle.

3. The post-mix beverage dispensing system of claim 1, wherein the carbonator pump combines water and carbon dioxide in the carhonator tank to produced carbonated water, and wherein the carbonated water flows into the carbonated water conduit.

4. The post-mix beverage dispensing system claim 1, further comprising:

an ice distribution mechanism; and an ice opening in the door, such that the ice distribution mechanism moves ice from the ice bin into the ice opening.

5. The post-mix beverage dispensing system of claim 1, wherein the top wall is detachably attached to the housing to allow access to the ice bin when the top wall is removed.

6. The post-mix beverage dispensing system of claim 1, wherein the top wall is hingedly connected to one of the back wall, first side wall, and second side wall to allow access to the ice bin when the top wall is in an open position.

7. The post-mix beverage dispensing system of claim 1, further comprising a pump positioned within the housing to move concentrate through the concentrate conduit.

8. The post-mix beverage dispensing system of claim 1, further comprising:

a second concentrate source positioned in the second compartment, wherein the coil pack includes a second concentrate conduit, and wherein the second concentrate conduit is fluidly connected to the second concentrate source and a second dispensing nozzle.

9. The post-mix beverage dispensing system of claim 8, wherein the housing includes a first interior structure that retains the concentrate source, and a second interior structure that retains the second concentrate source, the second interior structure being positioned below the first interior structure.

10. The post-mix beverage dispensing system of claim 8, further comprising:

a third concentrate source positioned in the second compartment, wherein the coil pack includes a third concentrate conduit, and wherein the third concentrate conduit is fluidly connected to the third concentrate source and a third dispensing nozzle.

11. The post-mix beverage dispensing system of claim 1, wherein the concentrate source is removable from the housing.

12. The post-mix beverage dispensing system of claim 1, wherein the refrigeration deck and carbonation deck are immersed in the water bath and configured to be removable from the housing.

* * * * *